(12) United States Patent
Elenes

(10) Patent No.: US 8,130,882 B2
(45) Date of Patent: Mar. 6, 2012

(54) RADIO RECEIVER HAVING A MULTIPATH EQUALIZER

(75) Inventor: Javier Elenes, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 313 days.

(21) Appl. No.: 12/570,760

(22) Filed: Sep. 30, 2009

(65) Prior Publication Data

US 2011/0075720 A1    Mar. 31, 2011

(51) Int. Cl.
*H04B 1/10* (2006.01)
(52) U.S. Cl. .................................. 375/350; 375/229
(58) Field of Classification Search .......... 375/229–230, 375/232, 346, 350; 708/300, 322–323
See application file for complete search history.

(56) References Cited

U.S. PATENT DOCUMENTS

| | | | | |
|---|---|---|---|---|
| 5,204,878 | A * | 4/1993 | Larsson | 375/232 |
| 5,557,646 | A * | 9/1996 | Honma | 375/346 |
| 6,766,021 | B2 * | 7/2004 | Kurtz et al. | 379/406.08 |
| 7,668,264 | B2 * | 2/2010 | Park et al. | 375/346 |
| 2001/0021940 | A1 * | 9/2001 | Fujii et al. | 708/318 |
| 2003/0016815 | A1 * | 1/2003 | Kurtz et al. | 379/406.01 |
| 2006/0177074 | A1 * | 8/2006 | Ko | 381/63 |
| 2007/0104264 | A1 * | 5/2007 | Park et al. | 375/233 |

OTHER PUBLICATIONS

Kammeyer et al., "A Modified Adaptive FIR Equalizer for Multipath Echo Cancellation in FM Transmission". IEEE Journal on Selected Areas in Communications, vol. SAC-5, No. 2, Feb. 1987, pp. 226-237.

* cited by examiner

*Primary Examiner* — Jean B Corrielus
(74) *Attorney, Agent, or Firm* — Polansky & Associates, P.L.L.C.; Paul J. Polansky

(57) ABSTRACT

A radio receiver has a multipath equalizer that includes a filter and a coefficient estimator. The filter provides a reconstructed signal by applying a transfer function including a reflection coefficient and a delay coefficient to a multipath radio signal. The coefficient estimator adapts the reflection coefficient and the delay coefficient in response to a deviation in magnitude of the reconstructed signal from a normalized value. In one form, the coefficient estimator adapts at least one of the reflection coefficient and the delay coefficient by estimating a partial derivative using a predetermined number of terms. In another form, the coefficient estimator acquires an initial value of the delay coefficient by determining a global minimum as a lowest one of a plurality of local minimums, each determined using a plurality of values of the delay coefficient, and selecting the initial value of the delay coefficient as its value at the global minimum.

20 Claims, 7 Drawing Sheets

RADIO RECEIVER HAVING A MULTIPATH EQUALIZER

CROSS REFERENCE TO RELATED, COPENDING APPLICATION

Related subject matter is found in a copending patent application Ser. No. 12/570,645, filed Sep. 30, 2009, entitled "Radio Receiver Having a Multipath Equalizer," invented by Javier Elenes and assigned to the assignee hereof.

FIELD OF THE DISCLOSURE

The present disclosure relates generally to radio frequency (RF) receivers, and more particularly to RF receivers for use in systems subject to reflection of transmitter signals.

BACKGROUND

Radio frequency (RF) receivers are used in a wide variety of applications such as radios, television receivers, cellular telephones, pagers, global positioning system (GPS) receivers, cable modems, cordless phones, and the like. As used herein, a "radio frequency" signal means an electrical signal conveying useful information and having a frequency from about 3 kilohertz (kHz) to hundreds of gigahertz (GHz), regardless of the medium through which such signal is conveyed. Thus an RF signal may be transmitted through air, free space, coaxial cable, fiber optic cable, etc. One of the problems with RF transmission systems is the problem of signal reflection. A receiver may receive multiple versions of the transmitted signal with different strengths and phase shifts because of signal reflection through the transmission medium. These phase shifted versions can destructively interfere with the main received signal and degrade it. The problem is worse for systems such as automobile radio receivers that constantly change position relative to a fixed antenna and that will occasionally be subject to relatively strong reflected signals.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items.

DETAILED DESCRIPTION

Figure 1:
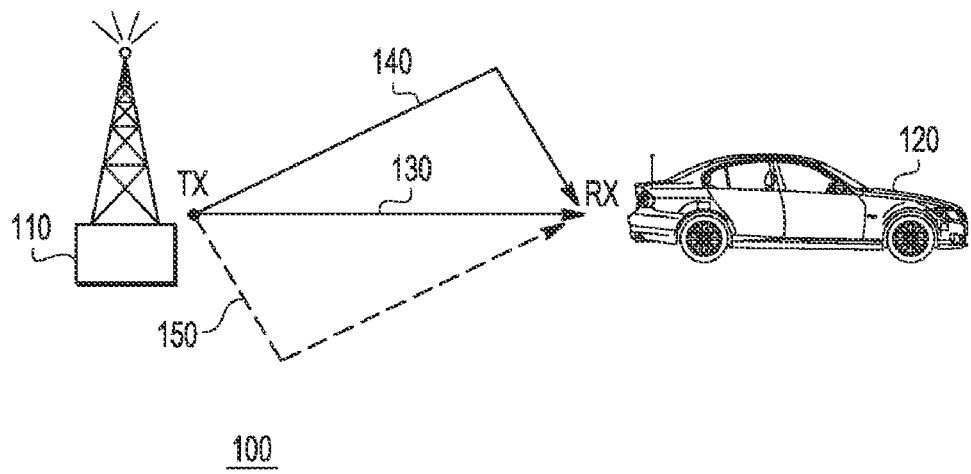
FIG. 1 illustrates in block diagram form a radio transmission system subject to multipath interference.

FIG. 1 illustrates in block diagram form a radio transmission system 100 subject to multipath interference. In system 100, a signal source such as a terrestrial FM radio antenna 110 broadcasts a signal to a receiver in an automobile 120. The transmitted signal, labeled "Tx", can reach the receiver by any of a number of paths. A path 130 is a direct or line-of-sight path and corresponds to the shortest line between transmitter 110 and the receiver in automobile 120. However the receiver also receives reflections of signal Tx over paths 140 and 150. These reflections interfere with the direct path signal, either constructively or destructively, and along with the direct path signal produce a multipath signal labeled "Rx". FIG. 1 shows path 140 as a solid line and path 150 as a dashed line to indicate that the signal received via path 140 is stronger than the signal received via path 150. Signals 140 and 150 arrive with random phase with respect to direct path signal 130. Moreover when automobile 120 is moving relative to antenna 110, one or more reflected signals with significant energy will frequently destructively interfere with the direct path signal, resulting in low signal-to-noise ratio and generally poor received signal quality.

In order to avoid the destructive interference and poor Rx signal quality caused by reflected signals along paths 140 and 150, the radio receiver in automobile 120 includes a multipath equalizer that digitally filters signal Rx to improve signal-to-noise ratio and signal quality by adaptively removing out-of-phase interference. Generally, the radio receiver down converts the received radio signal to a low intermediate frequency (LIF) signal that can be efficiently processed using a digital signal processor (DSP). The radio receiver implements the multipath equalizer in the digital domain using the DSP.

As will be described more fully below, the multipath equalizer assumes that only the signals along direct path 130 and path 140 have significant energy. By ignoring the reflected signal along path 150 and other weaker reflected signals, the radio receiver is able to simplify the signal processing required to allow for implementation in a low cost integrated circuit.

Figure 2:
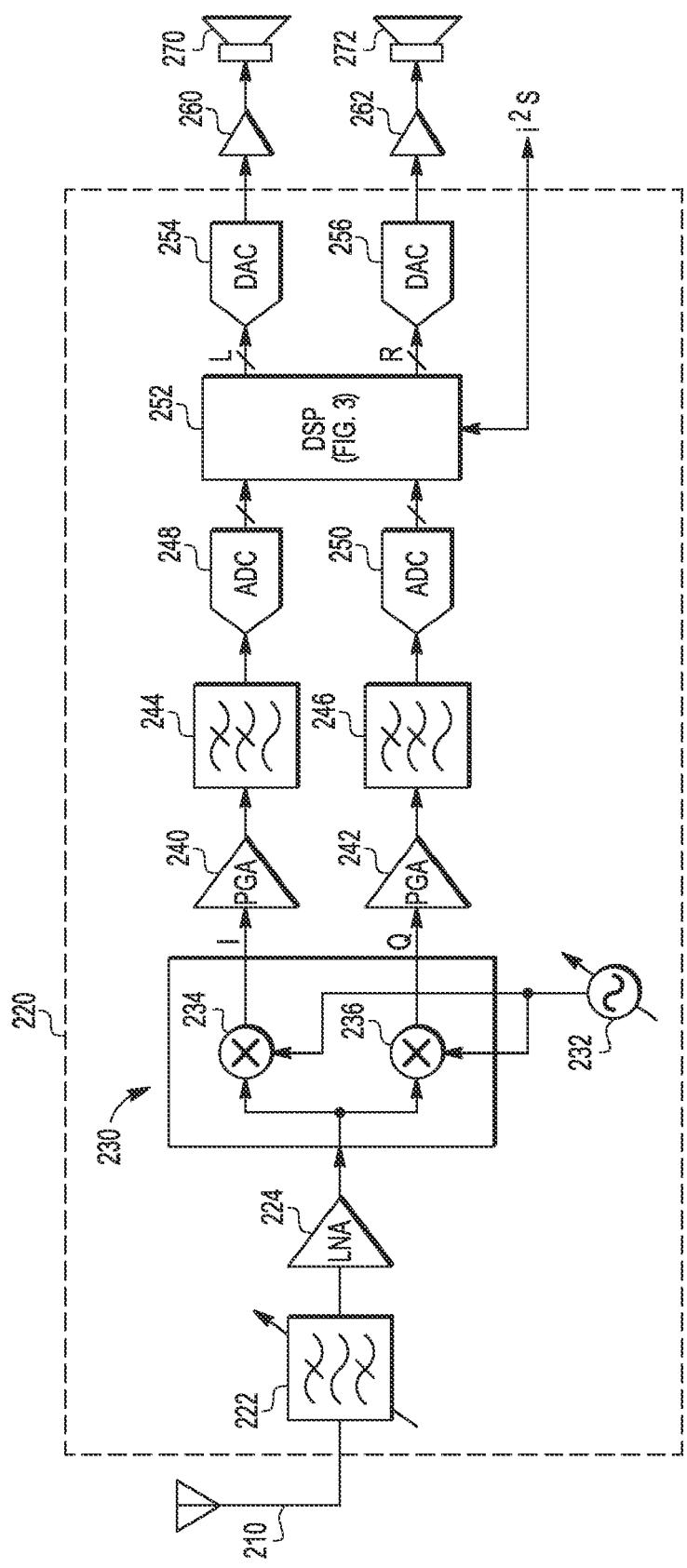
FIG. 2 illustrates in partial block diagram and partial schematic form a radio receiver with a multipath equalizer according to an embodiment of the present invention.

The overall architecture of the radio receiver will now be described with reference to FIG. 2, which illustrates in partial block diagram and partial schematic form a radio receiver 200 with a multipath equalizer according to an embodiment of the present invention. Radio receiver 200 includes generally an antenna 210, an integrated circuit receiver 220, power amplifiers 260 and 262, and loudspeakers 270 and 272.

Integrated circuit receiver 220 generally includes a tracking bandpass filter 222, a low noise amplifier (LNA) 224, a quadrature mixer 230, programmable gain amplifiers 240 and 242, lowpass filters 244 and 246, analog-to-digital converters (ADCs) 248 and 250, a DSP 252, and digital-to-analog converters (DACs) 254 and 256. Tracking bandpass filter 222 has an input connected to antenna 210, a tuning input for receiving a tuning signal from an on-chip microcontroller (MCU) (not shown in FIG. 2), and an output. LNA 224 has an input connected to the output of tracking bandpass filter 222, and an output. Mixer 230 has an input connected to the output of LNA 224, a first output for providing an in-phase signal labeled "I", and a second output for providing a quadrature signal labeled "Q". PGA 240 has an input connected to the I output of mixer 230, and an output. PGA 242 has an input connected to the Q output of mixer 230, and an output. Lowpass filter 244 has an input connected to the output of PGA 240, and an output. Lowpass filter 246 has an input connected to the output of PGA 242, and an output. ADC 248 has an input connected to the output of lowpass filter 240, and an output for providing a multi-bit digital output signal. ADC 250 has an input connected to the output of lowpass filter 242, and an output providing a multi-bit digital output signal. DSP 252 has inputs connected to the outputs of ADCs 248 and 250, an input/output port for being connected over a serial bus, known as an "I²S" bus, to the MCU, and first and second outputs for providing multi-bit digital output signals labeled "L" and "R", respectively. DAC 254 has an input connected to the first output of DSP 252 for receiving the L signal, and an output connected to an input of an off-chip power amplifier 260, whose output is provided to and drives loudspeaker 270. DAC 256 has an input connected to the second output of DSP 252 for receiving the R signal, and an output connected to an input of an off-chip power amplifier 262, whose output is provided to and drives loudspeaker 272.

More particularly mixer 230 includes a local oscillator 232, a multiplier 234, and a multiplier 236. Local oscillator 232 has an input for receiving a frequency control signal, and outputs for providing two local oscillator signals in quadrature with each other, one output providing an in-phase local oscillator signal and the other providing a quadrature local oscillator signal phase-shifted from the in-phase local oscillator signal by ninety degrees. Multiplier 234 has a first input connected to the output of LNA 224, a second input for receiving the in-phase local oscillator signal, and an output for providing the I signal. Multiplier 236 has a first input connected to the output of LNA 224, a second input for receiving the quadrature local oscillator signal, and an output for providing the Q signal.

Generally, receiver 220 receives stereo frequency modulated (FM) radio signals and converts them into demodulated signals capable of driving left and right loudspeakers 270 and 272, respectively. It implements a superheterodyne architecture in which the MCU controls the center frequency of tracking bandpass filter 222 and the frequency of local oscillator 232 according to a user-supplied tuning input. The MCU selects the frequency of local oscillator 232 to mix a desired channel to an LIF. Filters 244 and 246 reject undesired high frequency content of the down converted and amplified I and Q signals. ADCs 248 and 250 convert the filtered I and Q signals to the digital domain. DSP 252 further processes the digitized I and Q signals to produce digital signals to drive the left and right channels. The further processing includes down conversion to baseband, digital image rejection, FM demodulation, and multipath signal equalization.

Mathematically, the time domain output of the channel y(t) can be expressed as a function of the input of the channel x(t) as follows:

$$y(t)=x(t) \cdot \Sigma r_k \delta(t-\tau_k) \quad [1]$$

in which x(t) is the input of the channel, in this case the complex transmitted signal, y(t) is the output of the channel, in this case the received multipath signal, $r_k$ is the complex reflection coefficient for ray k, δ is the Dirac function, $\tau_k$ is the delay introduced by ray k, and the summing interval is over all values of k. The construction of the multipath equalizer can be simplified by assuming that only signals received via the line-of-sight path and a second reflection path will have significant energy. Such a multipath equalizer assumes a "2-ray" propagation channel model. Referring back to FIG. 1, a 2-ray multipath equalizer assumes that only paths 130 and 140 are significant, but that path 150 is not. Thus in a 2-ray model, equation [1] can be simplified as follows:

$$y(t)=x(t) \cdot (1+r\delta(t-\tau)) \quad [2]$$

In the discrete time domain, signal y(n) can be expressed as a function of transmitted signal x(n) as follows:

$$y(n)=x(n)+r \cdot x(n-D) \quad [3]$$

in which r is the reflection coefficient, D is the delay coefficient, x(n) is the direct path component, and r·x(n−D) is the reflected component. In equation [3], x, y, and r are complex numbers. The equivalent expression in the z domain is:

$$y(z)=x(z) \cdot (1+rz^{-D}) \quad [4]$$

The channel transfer function M(z) can be expressed as follows:

$$M(z) = \frac{y(z)}{x(z)} = 1 + rz^{-D} \quad [5]$$

Therefore to reconstruct the original transmitted signal from the received signal, the multipath equalizer must apply a transfer function H(z) as follows:

$$H(z) = \frac{1}{1 + rz^{-D}} \quad [6]$$

which is a form of an infinite impulse response (IIR) filter.

Now the multipath equalizer in DSP 252 will be described with reference to FIG. 3, which illustrates in block diagram form a multipath equalizer 300 used in DSP 252 of FIG. 2. Multipath equalizer 300 includes a digital filter labeled "H(z)" 310, and a coefficient estimator 320. Digital filter 310 has a signal input for receiving a sampled received signal labeled "x(n)", control inputs for receiving a reflection coefficient labeled "r" and a delay coefficient labeled "D", and an output for providing a reconstructed signal labeled "y(n)". Coefficient estimator 320 has a first input for receiving signal x(n), a second input for receiving signal y(n), and an output connected to the control inputs of digital filter 310 for providing coefficients r and D.

Generally multipath equalizer 300 is a "blind" equalizer because it does not use a training signal to reconstruct the transmitted signal from the received multipath signal. Rather it uses the property of constant modulo (CM) modulation systems that the amplitude is constant while the phase angle changes. CM modulation systems include frequency modulation (FM), phase modulation (PM), frequency shift keying (FSK) modulation, phase shift keying (PSK) modulation, etc., although FM is a very common one of those techniques. Coefficient estimator 320 adapts digital filter 310 to reconstruct the original signal by minimizing the deviation of the received signal magnitude from a normalized value.

Digital Filter

Digital filter 310 receives a multipath signal as an input signal x(n) and filters it using coefficients r and D according to transfer function H(z) to provide a reconstructed signal as output signal y(n). However r and D are functions of time and their values can change rapidly, especially when receiver 200 is used in a moving vehicle. Thus the accuracy of y(n) depends on the accuracy by which coefficient estimator 320 adapts r and D to changing conditions. As mentioned above, multipath equalizer 300 uses the property of CM signals that they have constant amplitudes to adapt r and D. In the example of FM signals, the amplitude is constant but the phase varies. Thus an FM signal can be viewed as points along a circle in the complex (I/Q) plane. Reflected signals distort the location of these points from being on the circle. Coefficient equalizer 320 adapts r and D to minimize the deviation of the magnitude of y(n) from this ideal circle. In particular, coefficient estimator 320 attempts to minimize the value of a mean squared error (MSE), which is a function of an error signal expressed as $|y(n)^2-1|$, where 1 is a normalized value of the received signal.

As long as $|r|<1$ and $D>0$, then a digital filter constructed using equation [5] is stable. However frequently a reflected signal will arrive with more energy than the direct path signal. In this case, $D<0$ and digital filter 300 would become unstable.

H(z) can be expressed in an equivalent form by expanding the IIR expression:

$$H(z) = \frac{1}{1+rz^{-D}} = 1 - rz^{-D} + r^2z^{-2D} - r^3z^{-3D} + r^4z^{-4D} \ldots \quad [5]$$

While this form of H(z) is stable, it is an infinite series and cannot be completely evaluated. Kammeyer et al. in "A Modified Adaptive FIR Equalizer for Multipath Echo Cancellation in FM Transmission," *IEEE J. on Selected Areas in Communication*, vol. SAC-5, no. 2, February 1987, pp. 226-237 disclose truncating this form of a digital filter to 64 terms. Such a filter is still too large for implementation in low-cost integrated circuits. However the inventor has discovered that the multipath equalizer can provide most of the benefits needed for broadcast FM radio systems if the infinite series of equation [5] is truncated to only the first eight terms.

Figure 3:
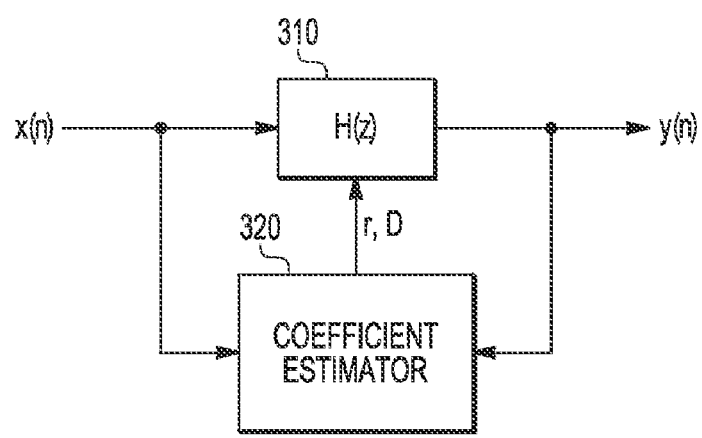
FIG. 3 illustrates in block diagram form the multipath equalizer used in the digital signal processor (DSP) of FIG. 2.
Figure 4:
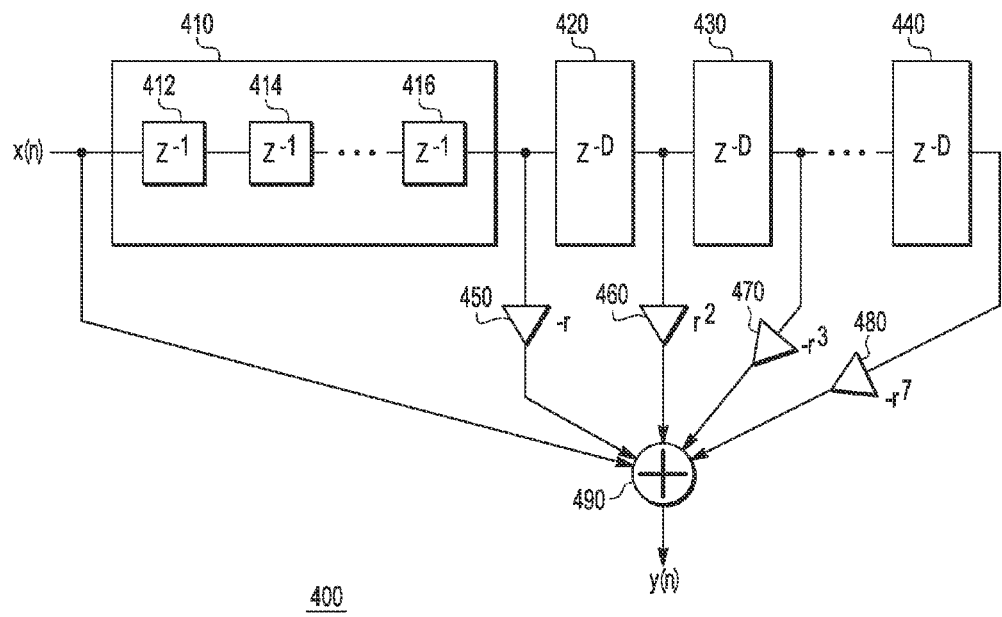
FIG. 4 illustrates in block diagram form a possible realization of the digital filter of FIG. 3.

Reference is now made to FIG. 4, which illustrates in block diagram form a possible realization 400 of digital filter 310 of FIG. 3. Digital filter 400 includes sample buffers and multipliers to implement digital filer 300 with eight terms, including representative sample buffers 410, 420, 430, and 440, representative multipliers 450, 460, 470, and 480, and a summing device 490. Sample buffer 410 has an input for receiving signal x(n), and an output. More particularly, sample buffer 410 includes further representative buffers 412, 414, and 416. Each buffer is serially connected and implements a single unit delay labeled "$z^{-1}$". Sample buffer 420 has an input connected to the output of sample buffer 410, and an output. Sample buffer 430 has an input connected to the output of sample buffer 420, and an output connected to another sample buffer, not shown in FIG. 4. Sample buffer 440 has an input connected to the output of yet another sample buffer, not shown in FIG. 4, and an output. Multiplier 450 has an input connected to the output of sample buffer 410, and an output, and multiplies the input thereof by a factor of –r. Multiplier 460 has an input connected to the output of sample buffer 420, and an output, and multiplies the input thereof by a factor of $r^2$. Multiplier 470 has an input connected to the output of sample buffer 430, and an output, and an output, and multiplies the input thereof by a factor of $-r^3$. Multiplier 480 has an input connected to the output of sample buffer 440, and an output, and multiplies the input thereof by a factor of $-r^7$. Summing device 490 has a first input for receiving x(n), additional inputs connected to the outputs of seven multipliers including representative multipliers 450, 460, 470, and 480, and an output for providing signal y(n).

Digital filter 400 is useful in understanding the practical difficulties of constructing a digital filter in DSP circuitry. In the example shown in FIG. 4, equation [5] is truncated to only eight terms. However even an 8-term implementation of the digital filter is still computationally intensive because the DSP must perform (N–1)=7 multiplies, in which N is the number of terms and is equal to eight. Thus a conventional FIR filter truncated to a reasonable number of terms is still expensive in terms of circuit area and computational time.

In order to implement digital filter 310 less expensively while maintaining good fidelity for commercial FM transmission systems, the inventor has discovered not only that the IIR form of H(z) can be converted into an equivalent infinite series and truncated to eight terms, but also that this eight-term filter can then be evaluated using an algebraic simplification of equation [5] of only three terms:

$$H(z)=(1-rz^{-D})\times(1+r^2z^{-2D})\times(1+r^4z^{-4D}) \quad [6]$$

This form of H(z) requires only $\log_2 N=3$ multiplies.

Figure 5:
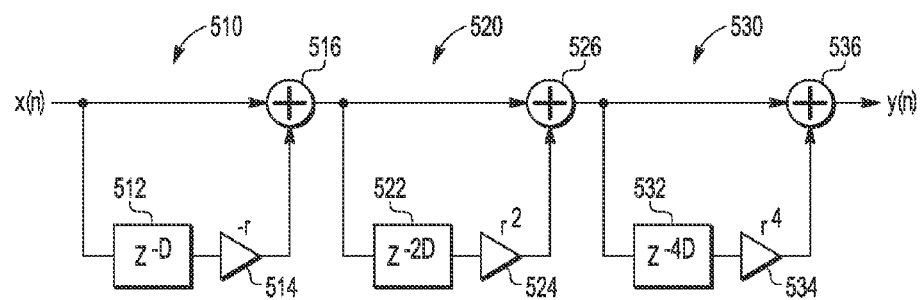
FIG. 5 illustrates in block-diagram form the digital filter used in the multipath equalizer of FIG. 3.

An implementation of such a digital filter is shown in FIG. 5, which illustrates in block diagram form digital filter 310 used in multipath equalizer 300 of FIG. 3. Digital filter 310 generally includes a first term section 510, a second term section 520, and a third term section 530. First term section 510 includes a delay buffer 512, a multiplier 514, and a summing device 516. Delay buffer 512, labeled "$z^{-D}$", has an input for receiving x(z), and an output, and applies a delay of D. Multiplier 514 has an input connected to the output of delay buffer 512, and an output, and multiplies the input thereof by a factor of –r. Summing device 516 has a first input for receiving signal x(n), a second input connected to the output of multiplier 514, and an output.

Second term section 520 includes a delay buffer 522, a multiplier 524, and a summing device 526. Delay buffer 522, labeled "$z^{-2D}$", has an input connected to the output of summing device 516, and an output, and applies a delay of 2D. Multiplier 524 has an input connected to the output of delay buffer 522, and an output, and multiplies the input thereof by a factor of $r^2$. Summing device 526 has a first input the output of summing device 516, a second input connected to the output of multiplier 524, and an output.

Third term section 530 includes a delay buffer 532, a multiplier 532, and a summing device 536. Delay buffer 532, labeled "$z^{-4D}$", has an input connected to the output of summing device 526, and an output, and applies a delay of 4D. Multiplier 534 has an input connected to the output of delay buffer 532, and an output, and multiplies the input thereof by a factor of $r^4$. Summing device 536 has a first input the output of summing device 526, a second input connected to the output of multiplier 534, and an output for providing signal y(n).

Digital filter 310 evaluates H(z) not only by truncating the infinite series form of the IIR filter to eight terms, but also by using an algebraic simplification of this truncated estimation, resulting in a digital filter having only three terms and requiring only three multiplies. In general this algebraic simplification reduces the number of multiplies required from (N–1) to $\log_2 N$, in which N is the number of terms the truncated series. Thus the digital filter can be implemented more easily in a low-cost integrated circuit using DSP technology.

Figures 6, 7, 8:
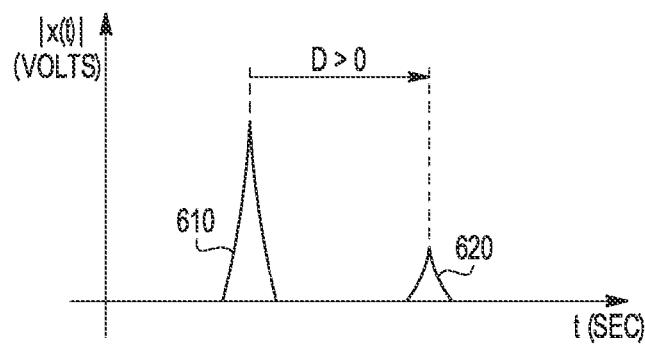
FIG. 6 illustrates a graph of the reception of a multipath radio signal under line-of-sight conditions.
FIG. 7 illustrates a graph of the reception of a multipath radio signal under non line-of-sight conditions.
FIG. 8 illustrates in block diagram form a delay buffer for use in the digital filter of FIG. 3.

As noted above, multipath equalizer 300 assumes a 2-ray propagation channel model by assuming the presence of a line-of-sight signal and only one reflected signal with significant energy. However occasionally the line-of-sight will be partially obstructed such that the strongest received signal may actually arrive later than the line-of-sight signal. This condition is illustrated with respect to FIGS. 6 and 7. FIG. 6 illustrates a graph 600 of the reception of a multipath radio signal x(t) under line-of-sight conditions. In graph 600, the horizontal axis represents time between transmission and reception in seconds, and the vertical axis the amplitude of the absolute value of the received signal x(t) in volts. In the example shown in FIG. 6, a first received or line-of-sight signal 610 has greater amplitude than a later received signal 620. Thus, D is greater than 0. In contrast, FIG. 7 illustrates a graph 700 of the reception of a multipath radio signal under non line-of-sight conditions. In graph 700, the horizontal axis represents time between transmission and reception in seconds, and the vertical axis the absolute value of the received signal x(t) in volts. In the example shown in FIG. 7, a first received or line-of-sight signal 710 has smaller amplitude than a later received signal 720. Since the multipath equalizer uses the ray with the strongest signal as the primary ray, D is less than 0. While conventional digital filters operate in causal systems, they cannot accommodate non-causal systems. What is needed then is a digital filter that is able to accommodate both causal and non-causal conditions.

A portion of such a filter is shown in FIG. 8, which illustrates in block diagram form a delay line 800 for use in digital filter 310 of FIG. 3. Delay line 800 includes two sections including a set of delay elements 810, and a set of delay elements 830. Set 810 has K delay elements including representative delay elements 812, 814, and 816 all connected in series. First delay element 812 has an input for receiving and storing a sample x(n+K), and last delay element 816 has an output forming the output of set 810. The output of delay element 816 forms sample x(n). Set 830 has K delay elements including representative delay elements 832, 834, and 836 all connected in series with the input of first delay element 832 connected to the output of delay element 816, and last delay element 836 storing sample x(n−K).

Delay line 800 accommodates both causal (line-of-sight) and non-causal systems by a modest expansion of the size of the delay buffer by K elements. K is large enough to implement equation [6] for D=16. In a causal system with positive values of D, filter 310 uses current sample x(n) and samples from second set 830 as described above. In a non-causal system with negative values of D, however, filter 310 uses current sample x(n) and samples from first set 810.

In DSP implementations, delay buffer 800 does not actually include samples that shift every clock period. Rather the DSP stores the samples in sequential locations in a memory and adjusts pointers into the memory. For example if D is equal to 16, the DSP uses an indexed addressing mode to retrieve the samples from the buffer, in strides of 16.

Figure 9:
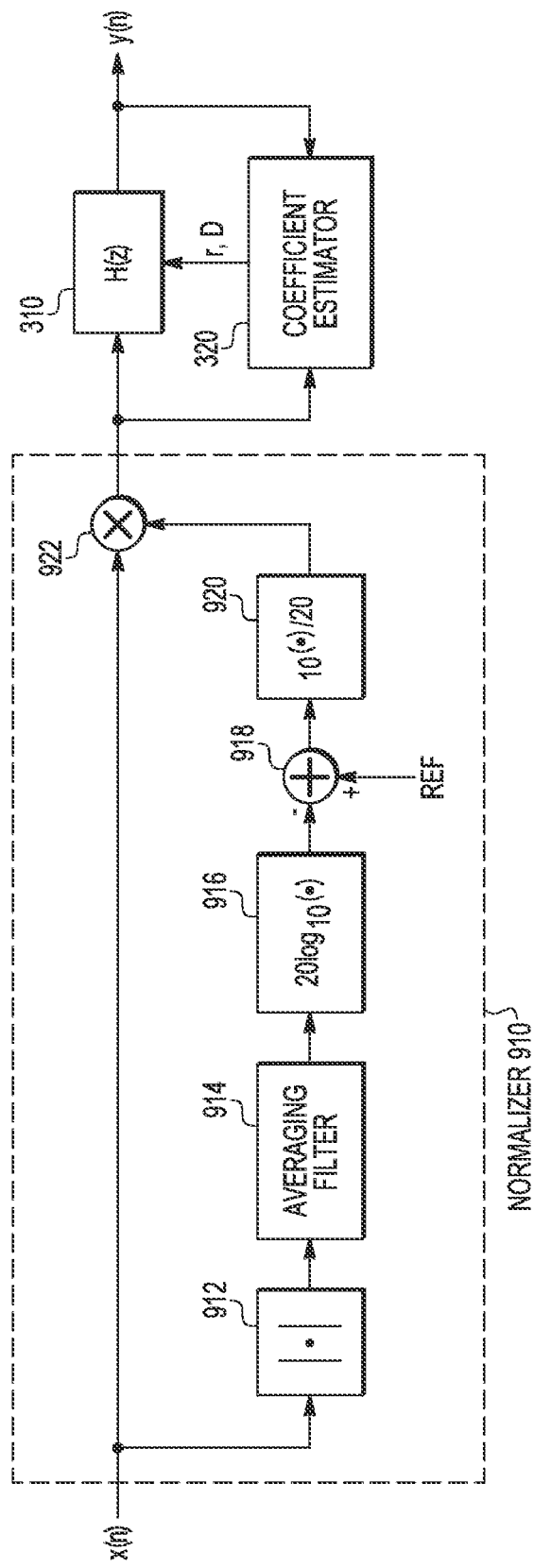
FIG. 9 illustrates in block diagram form a digital filter for use in a multipath equalizer according to another embodiment of the present invention.

FIG. 9 illustrates in block diagram form a multipath equalizer 900 according to another embodiment of the present invention. Multipath equalizer 900 includes a normalizer 910, digital filter 310, and coefficient estimator 320. Normalizer 910 has an input for receiving signal x(n), and an output. Digital filter 310 has a signal input connected to the output of normalizer 910, control inputs for receiving coefficients r and D, and an output for providing signal y(n). Coefficient estimator 320 has a first input connected to the output of normalizer 910, a second input for receiving y(n), and an output connected to the control inputs of digital filter 310 for providing coefficients r and D.

In particular normalizer 910 includes an absolute value block 912, an avergaing filter 914, a linear-log converter 916, a summing device 918, a log-linear converter 920, and a multiplier 922. Absolute value block 912 has an input for receiving signal x(n), and an output. IIR filter 914 has an input connected to the output of absolute value block 912, and an output. Linear-log converter 916 has an input connected to the output of IIR filter 914, and an output. Summing device 918 has a first input connected to the output of linear-log converter 916, a second input for receiving a reference level labeled "REF", and an output. Log-linear converter 920 has an input connected to the output of summing device 918, and an output. Multiplier 922 has a first input for receiving x(n), a second input connected to the output of log-linear converter 920, and an output connected to the input of digital filter 310.

Normalizer 910 converts the amplitude of signal x(n) to a suitable level that becomes a known, normalized magnitude of the signal. This normalized magnitude can be used as a reference by coefficient estimator 320 to determine the error signal.

Coefficient Estimator

Figure 10:
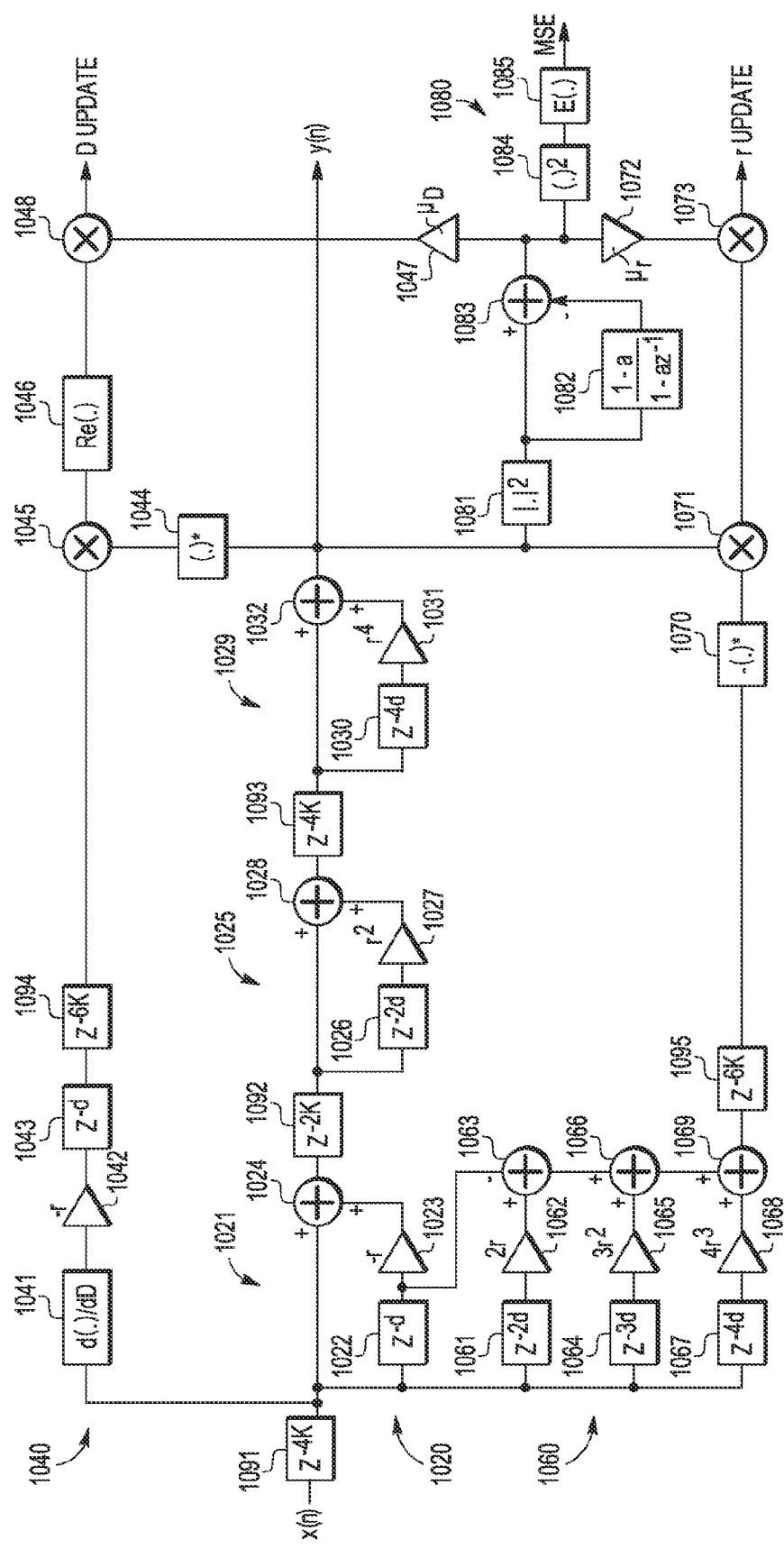
FIG. 10 illustrates in block diagram form a specific implementation of the multipath equalizer of FIG. 3.

FIG. 10 illustrates in block diagram form a specific implementation 1000 of multipath equalizer 300 of FIG. 3. This implementation uses two important simplifications for the coefficient updates that reduces computation time and allows implementation in a low-cost integrated circuit. Multipath equalizer 1000 has elements corresponding to both digital filter 310 and coefficient estimator 320, and includes generally a digital filter portion 1020, a delay update portion 1040, an r update portion 1060, an error estimation portion 1080, and group delay elements 1091-1095.

Group delay element 1091 has an input for receiving signal x(n), and an output, and applies a delay of 4K. Digital filter portion 1020 includes a first term section 1021, a second term section 1025, and a third term section 1029. First term section 1021 includes a delay buffer 1022, a multiplier 1023, and a summing device 1024. Delay buffer 1022, labeled "$z^{-D}$", has an input connected to the output of group delay element 1091, and an output, and applies a delay of D. Multiplier 1023 has an input connected to the output of delay buffer 1022, and an output, and multiplies the input thereof by a factor of −r. Summing device 1024 has a first input connected to the output of group delay element 1091, a second input connected to the output of multiplier 1023, and an output.

Group delay element 1092 has an input connected to the output of summing device 1024, and an output. Second term section 1025 includes a delay buffer 1026, a multiplier 1027, and a summing device 1028. Delay buffer 1026, labeled "$z^{-D}$", has an input connected to the output of group delay element 1092, and an output, and applies a delay of 2D. Multiplier 1027 has an input connected to the output of delay buffer 1026, and an output, and multiplies the input thereof by a factor of $r^2$. Summing device 1028 has a first input connected to the output of group delay element 1092, a second input connected to the output of multiplier 1027, and an output.

Group delay element 1093 has an input connected to the output of summing device 1028, and an output. Third term section 1029 includes a delay buffer 1030, a multiplier 1031, and a summing device 1032. Delay buffer 1030, labeled "$z^{-4D}$", has an input connected to the output of group delay element 1093, and an output, and applies a delay of 4D. Multiplier 1031 has an input connected to the output of group delay element 1030, and an output, and multiplies the input thereof by a factor of $r^4$. Summing device 1031 has a first input connected to the output of group delay element 1093, a second input connected to the output of multiplier 1031, and an output for providing signal y(n).

Delay update portion 1040 includes a partial derivative block 1041, a multiplier 1042, a delay element 1043, a complex conjugate operator block 1044, a multiplier 1045, a real operator block 1046, a multiplier 1047, and a multiplier 1048. Derivative block 1051 has an input connected to the output of group delay element 1091, and an output. Multiplier 1042 has an input connected to the output of partial derivative block 1041, and an output, and multiplies the input thereof by a factor of −r. Delay element 1043, labeled "$z^{-D}$", has an input connected to the output of multiplier 1042, and an output, and provides a delay of D. Group delay element 1094 has an input connected to the output of delay element 1043, and an output, and provides a delay of 6K. Complex conjugate operator block 1044 has an input for receiving signal y(n), and an output. Multiplier 1045 has a first input connected to the output of group delay element 1094, a second input connected to the output of complex conjugate operator block 1044, and an output. Real operator block 1046 has an input connected to the output of multiplier 1045, and an output. Multiplier 1047 has an input connected for receiving an error signal labeled "e", and an output, and multiplies the input thereof by a factor of $\mu_k$. Multiplier 1048 has a first input connected to the output of real operator bock 1046, a second input connected to the output of multiplier 1047, and an output for providing a signal labeled "DELAY UPDATE".

r update section 1060 includes a delay element 1061, a multiplier 1062, a summing device 1063, a delay element 1064, a multiplier 1065, a summing device 1066, a delay element 1067, a multiplier 1068, a summing device 1069, a complex conjugate block 1070, a multiplier 1071, a multiplier 1072, and a multiplier 1073. Delay element 1061, labeled "$z^{-2D}$", has an input connected to the output of group delay element 1091, and an output, and applies a delay of 2D. Multiplier 1062 has an input connected to the output of delay element 1061, and an output, and multiplies the input thereof by a factor of 2r. Summing device 1063 has a first input connected to the output of delay element 1022 in digital filter portion 1020, a second input connected to the output of multiplier 1062, and an output. Delay element 1064, labeled "$z^{-3D}$", has an input connected to the output of group delay element 1091, and an output, and applies a delay of 3D. Multiplier 1065 has an input connected to the output of delay element 1064, and an output, and multiplies the input thereof by a factor of $3r^2$. Summing device 1066 has a first input connected to the output of summing device 1063, a second input connected to the output of multiplier 1065, and an output. Delay element 1067, labeled "$z^{-4D}$", has an input connected to the output of delay element 1091, and an output, and applies a delay of 4D. Multiplier 1068 has an input connected to the output of delay element 1067, and an output, and multiplies the input thereof by a factor of $4r^3$. Summing device 1069 has a first input connected to the output of summing device 1066, a second input connected to the output of multiplier 1068, and an output. Group delay element 1095, labeled "$z^{-6K}$", has an input connected to the output of summing device 1069, and an output, and applies a delay of 6K. Complex conjugate block 1070 has an input connected to the output of group delay element 1095, and an output. Multiplier 1071 has a first input connected to the output of complex conjugate block 1070, a second input for receiving signal y(n), and an output. Multiplier 1072 has an input for receiving signal e, and an output, and multiplies the input thereof by a factor of $\mu_r$. Multiplier 1073 has a first input connected to the output of multiplier 1072, a second input connected to the output of multiplier 1071, and an output for providing an output signal labeled "r UPDATE".

Error estimation portion 1080 includes an absolute value block 1081, an averaging filter 1082, a summing device 1083, a square block 1084, and an expected value 1085. Absolute value block 1081 has an input for receiving signal y(n), and an output, and outputs a square of an absolute value of an input thereof. Averaging filter 1082 has an input connected to the output of absolute value block 1081, and an output, and applies a transfer function of $$\frac{1-a}{1-az^{-1}}$$

thereto. Summing device 1083 has a positive input connected to the output of absolute value block 1081, a negative input connected to the output of smoothing filter 1082, and an output for providing signal e. Square block 1084 has an input connected to the output of summing device 1083, and an output. Expected value block 1085 has an input connected to the output of square block 1084, and an output for providing a mean-squared-error output signal labeled "MSE".

Digital filter portion 1020 implements the digital filtering function H(z) as disclosed above and thus y(n) is equal to the input sample x(n) multiplied by H(z) as expressed in equation [6] above. Group delay elements 1091-1093 ensure that the outputs of digital filter portion 1020 correspond in time to the outputs of D update portion 1040 and r update portion 1060.

Error estimation portion 1080 calculates error signal e used by both delay update portion 1040 and r update portion 1060, and mean-squared-error signal MSE for use by DSP 252 in performing r and D acquisition and updating. Note that averaging filter 1082 determines an average level of the reconstructed signal. However in embodiments in which normalizer 910 is used, summing device 1083 would receive the square of REF at its negative input and averaging filter 1082 would be eliminated.

In general, the output y can be expressed in the sampling domain as a product of a transposed matrix $X^T$ and a matrix of coefficients h, or $$y = X^T \cdot h \qquad [7]$$

in which X is a matrix of samples of the received signal sampled at intervals of length D:

$$X = [x(n)\ x(n-D)\ x(n-2D)\ x(n-3D) \ldots ] \qquad [8]$$

and h is equal to a matrix of filter coefficients:

$$h = [h0\ h1\ h2\ h3 \ldots ] \qquad [9]$$

or more particularly:

$$h = [1\ -r\ -r^2\ -r^3 \ldots ] \qquad [10]$$

The delay update is expressed as:

$$D(i+1) = D(i) - \mu_D \cdot e(i) \cdot Re\left\{ y^*(i) \cdot h^T(i) \cdot \frac{\partial x(i)}{\partial D(i)} \right\} \qquad [11]$$

in which D(i+1) is the updated value of D, D(i) is the current value of D, $\mu_D$ is a smoothing coefficient, e(i) is the current error signal, $y^*(i)$ is the complex conjugate of the current filtered output y(i), and $$\frac{\partial x(i)}{\partial D(i)}$$

is the partial derivative of x(i) with respect to D(i).

x(i) is a matrix of values of infinite length. However the inventor has discovered that the partial derivative $$\frac{\partial x(i)}{\partial D(i)}$$

can be estimated as $$\frac{\partial [x(n)\ x(n-D)]}{\partial D(i)}$$

and still provide relatively fast convergence. Moreover $$\frac{\partial[\,x(n)\quad x(n-D)]}{\partial D(i)}$$

is equal to $$\frac{\partial[x(n-D)]}{\partial D(i)}$$

since $$\frac{\partial x(n)}{\partial D(i)}$$

is equal to 0. Thus the partial derivative can be approximated by evaluating a single partial derivative term. Partial derivative block 1041 performs this evaluation, and multiplies the result by corresponding coefficient –r in multiplier 1042. The remainder of equation [11] is performed by elements 1044-1048 to yield D(i+1). Thus the estimation of the partial derivative expression using two terms allows the multipath equalizer to be implemented in a low-cost integrated circuit.

The r update is expressed as:

$$r(i+1) = r(i) - \mu_r \cdot e(i) \cdot y(i) \left[ X^T \cdot \frac{\partial h(i)}{\partial r(i)} \right]^* \quad [12]$$

in which r(i+1) is the updated value of r, r(i) is the current value of r, $\mu_r$ is a smoothing coefficient, e(i) is the prior error signal, y(i) is the prior output signal, $X^T$ is the transposed matrix of input samples, and $$\frac{\partial h(i)}{\partial r(i)}$$

is the partial derivative of h(i) with respect to r(i). As with equation [11], evaluation of the partial derivative term is problematical since h(i) is a matrix of values of infinite length. The inventor has discovered that the partial derivative $$\frac{\partial x(i)}{\partial D(i)}$$

can be estimated as $-rx(n-D)+2rx(n-2D)+3r^2x(n-3D)+4r^3x(n-4D)$ and still provide relatively fast convergence. It can be seen that this approximation represents the partial derivative of each coefficient with respect to r, truncated to four terms. r update portion 1060 used elements 1061-1069 to evaluate the expression, and advantageously uses the output of delay element 1022 already generates a needed value for filter portion 1020. The remainder of equation [12] is performed by elements 1070-1073 to yield the new value of r, i.e. r(i+1).

Figure 11:
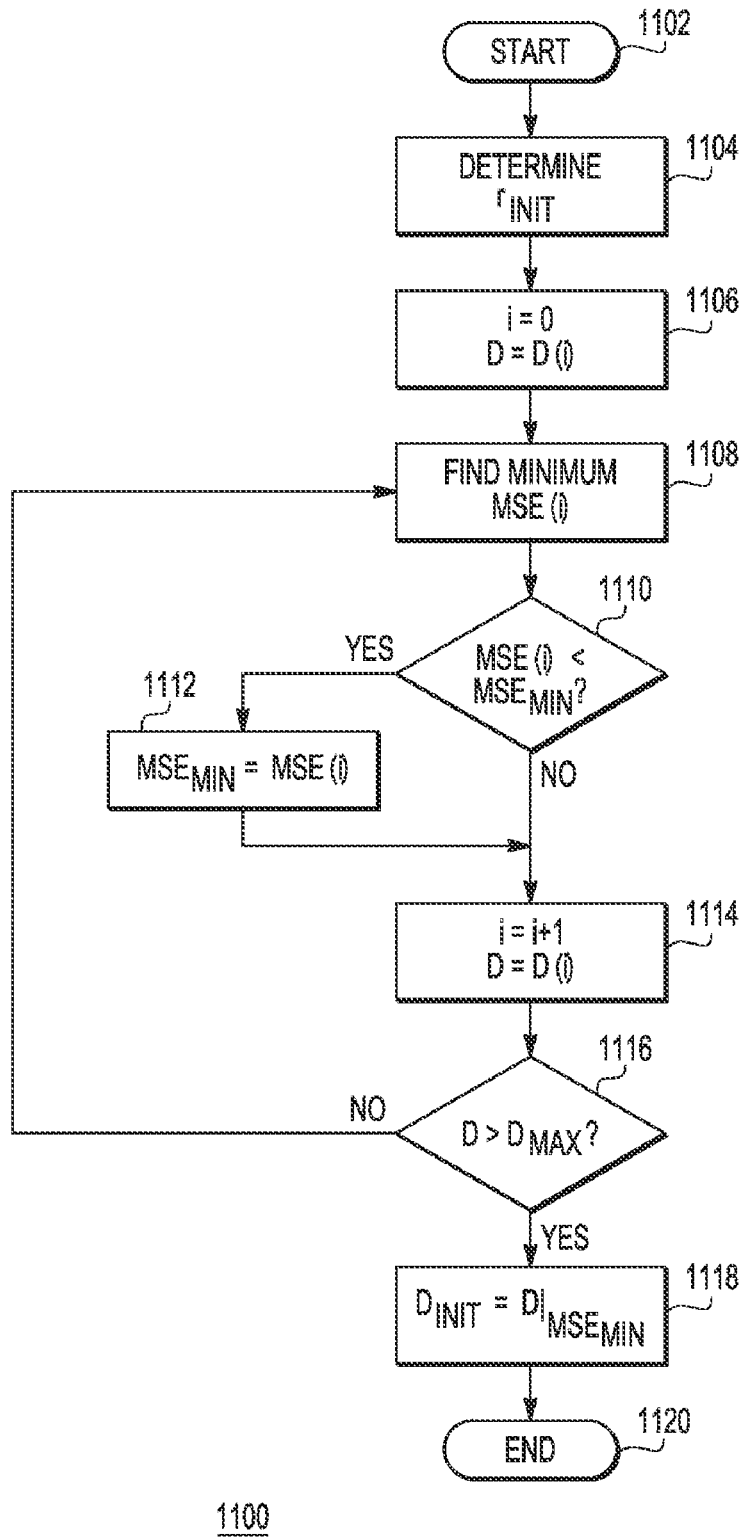
FIG. 11 illustrates a flow diagram of an acquisition of a delay coefficient by the coefficient estimator of FIG. 3.

FIG. 11 illustrates a flow diagram 1100 of an acquisition of a reflection coefficient r and a delay coefficient D by coefficient estimator 320 of FIG. 3. The method starts at step 1102. Coefficient estimator 320 acquires an initial value of r labeled "$r_{INIT}$" at step 1104. Coefficient estimator 320 performs the r acquisition by searching for the lowest MSE as r varies, and selecting the value of r at the minimum MSE as $r_{INIT}$. The inventor has discovered that the algorithm for acquiring $r_{INIT}$ converges well to its approximate global minimum. Likewise coefficient estimator 320 performs the D acquisition by searching for the lowest MSE as D varies. However the algorithm does not converge well to its approximate global minimum because there are frequently multiple local minimums of the MSE as D varies. In order to overcome this problem, receiver 220 acquires an initial value of D by searching for a global minimum. The global minimum is a lowest one of the local minimums. Coefficient estimator 320 determines each local minimum by using a different starting values of D. The initial acquired value of D is thus a value of D at the global minimum. The remainder of flow chart 1100 details the D acquisition process.

Coefficient estimator 320, at step 1106, sets an initial value of index i to 0, and an initial value of D to D(i)=D(0). Then at step 1108 it finds a minimum MSE, designated "MSE(i)", using adaptation techniques. Thus MSE(i) may be a local minimum or the global minimum. At step 1110, it determines whether the current MSE, i.e. MSE(i), is less than a previous lowest MSE labeled "$MSE_{MIN}$". If so, then it sets $MSE_{MIN}$ to MSE(i), but if not it keeps $MSE_{MIN}$ at its previous value. If D=D(0), then it sets $MSE_{MIN}$ to MSE(0). At step 1114 it increments the index variable i, and then sets D to be equal to the next starting value of D, D(i+1). At step 1116 it determines whether the last starting value of D has been tried. If not, it repeats steps 1108-1114. Once the last starting value of D has been tried, then at step 1118 it sets $D_{INIT}$ as the value of D at $MSE_{MIN}$, and the acquisition ends at step 1120.

In the contemplated embodiment, D assumes integer values between –16 and +15. Method 1100 uses starting values of D of –12, –9, –6, –3, 0, 3, 6, 9, and 12 as i varies from 0 to 7.

During operation after $D_{INIT}$ has been acquired, D is simply adapted from the current value of D using equation [11] so long as the MSE value in any one period is not too big compared to the previous MSE value. However if the MSE suddenly becomes large, i.e. when MSE(i+1)>k·MSE(i) in which k is a coefficient greater than 1, coefficient estimator 320 reacquires it using flow 1100.

Thus coefficient estimator 320 is able to estimate values of r and D efficiently using DSPs with a reasonable amount of circuit area, allowing a multipath equalizer to be implemented in a low cost integrated circuit. This efficient implementation is due to estimating partial derivative expressions using a limited number of terms. In the case of the D update, it requires just a single term. In the case of the r update, it requires only four terms. Moreover the most appropriate value of D is acquired even though the algorithm may not converge to the best value using normal binary searching techniques.

Note that DSP 342 is a DSP that is capable of executing a stored program using available instructions from its instruction repertoire. Thus the implementation of either digital filter 310 or coefficient estimator 320 is performed by a combination of DSP 252 and software or firmware. However in other embodiments, these functions could be performed by different combinations of hardware and software. Thus the FIGs. are to be understood as covering their respective functions regardless of which mechanism is chosen to perform this function.

Therefore the above-disclosed subject matter is to be considered illustrative, and not restrictive, and the appended claims are intended to cover all such modifications, enhancements, and other embodiments that fall within the true scope of the claims. Thus, to the maximum extent allowed by law, the scope of the present invention is to be determined by the broadest permissible interpretation of the following claims and their equivalents, and shall not be restricted or limited by the foregoing detailed description.

What is claimed is:

1. A radio receiver having a multipath equalizer comprising:
   a filter having an input for receiving a multipath radio signal, and an output for providing a reconstructed signal, wherein said filter applies a transfer function to said multipath radio signal to produce said reconstructed signal, said transfer function including a reflection coefficient and a delay coefficient; and
   a coefficient estimator having a first input for receiving said multipath radio signal, a second input for receiving said reconstructed signal, and an output coupled to said filter for providing said reflection coefficient and said delay coefficient,
   wherein said coefficient estimator adapts said reflection coefficient and said delay coefficient in response to a deviation of said reconstructed signal from a normalized value;
   wherein said coefficient estimator adapts at least one of said reflection coefficient and said delay coefficient by estimating a partial derivative using a predetermined number of terms.

2. The radio receiver of claim 1 wherein said at least one of said reflection coefficient and said delay coefficient comprises said reflection coefficient, and said partial derivative is a partial derivative of said transfer function with respect to said reflection coefficient.

3. The radio receiver of claim 2 wherein said predetermined number of terms is equal to four.

4. The radio receiver of claim 2 wherein said coefficient estimator adapts said reflection coefficient by subtracting from a current reflection coefficient a product of a smoothing coefficient, an error value, and a mathematical expression including said partial derivative.

5. The radio receiver of claim 4 wherein said mathematical expression comprises a product of said reconstructed signal and a complex conjugate of said multipath signal and said partial derivative.

6. The radio receiver of claim 1 wherein said at least one of said reflection coefficient and said delay coefficient is said delay coefficient, and said partial derivative comprises a partial derivative of said multipath radio signal with respect to said delay coefficient.

7. The radio receiver of claim 6 wherein said predetermined number of terms is equal to one.

8. The radio receiver of claim 2 wherein said coefficient estimator adapts said delay coefficient by subtracting from a current delay coefficient a product of a smoothing coefficient, an error value, and a mathematical expression including said partial derivative.

9. The radio receiver of claim 8 wherein said mathematical expression comprises a real portion of a product of a complex conjugate of said reconstructed signal, said transfer function, and said partial derivative.

10. The radio receiver of claim 1 further comprising a digital signal processor (DSP) for implementing said filter and said coefficient estimator.

11. The radio receiver of claim 1 wherein said multipath radio signal is further characterized as being a frequency modulated (FM) signal.

12. A radio receiver having a multipath equalizer comprising:
   a filter having an input for receiving a multipath radio signal, and an output for providing a reconstructed signal, wherein said filter applies a transfer function to said multipath radio signal to produce said reconstructed signal, said transfer function including a reflection coefficient and a delay coefficient; and
   a coefficient estimator having a first input for receiving said multipath radio signal, a second input for receiving said reconstructed signal, and an output coupled to said filter for providing said reflection coefficient and said delay coefficient,
   wherein said coefficient estimator adapts said reflection coefficient and said delay coefficient in response to a deviation of said reconstructed signal from a normalized value;
   wherein said coefficient estimator acquires an initial value of said delay coefficient by determining a global minimum of said deviation as a lowest one of a plurality of local minimums each determined using a plurality of values of said delay coefficient, and selecting said initial value of said delay coefficient as a value of said delay coefficient at said global minimum.

13. The radio receiver of claim 12 wherein said coefficient estimator determines each local minimum of said deviation by selecting one of said plurality of values of said delay coefficient and changing said delay coefficient until said deviation is at said local minimum.

14. The radio receiver of claim 12 wherein said deviation is proportional to a mean squared error (MSE) and wherein said coefficient estimator reacquires said initial value of said delay coefficient if said MSE is greater than a predetermined factor times an MSE at said global minimum.

15. The radio receiver of claim 14 wherein said MSE is equal to the absolute value of a difference between a square of said reconstructed signal and said normalized value.

16. A method for use in a radio receiver having a multipath equalizer comprising:
   applying a transfer function including a delay coefficient to a multipath radio signal to produce a reconstructed signal;
   determining a mean squared error (MSE) proportional to a deviation in magnitude of a square of said reconstructed signal from a normalized value;
   determining for each of a plurality of starting values of said delay coefficient a corresponding local minimum of said MSE;
   determining a global minimum of said delay coefficient as a lowest local minimum; and
   determining an initial delay coefficient as a value of said delay coefficient at said global minimum.

17. The method of claim 16 further comprising:
   adapting said delay coefficient to produce a new value of said delay coefficient if a current MSE is not greater than a predetermined factor times an MSE at said global minimum.

18. The method of claim 17 further comprising:
   reacquiring said delay coefficient if said current MSE is greater than said predetermined factor times said MSE at said global minimum.

19. The method of claim 16 wherein said applying further comprises:
   applying a transfer function including both a reflection coefficient and said delay coefficient to said multipath radio signal to produce said reconstructed signal.

20. The method of claim 19 further comprising:
   acquiring said reflection coefficient before acquiring said delay coefficient.

\* \* \* \* \*